United States Patent
Gougeon et al.

(10) Patent No.: US 12,377,997 B2
(45) Date of Patent: Aug. 5, 2025

(54) PROPULSION SYSTEM OF AN AIRCRAFT, HAVING AN ASYMMETRICAL NACELLE

(71) Applicant: Airbus Operations SAS, Toulouse (FR)

(72) Inventors: Pascal Gougeon, Toulouse (FR); Alexandre Bellanger, Toulouse (FR); Simon Vanderbauwede, Toulouse (FR)

(73) Assignee: Airbus Operations SAS, Toulouse (FR)

( * ) Notice: Subject to any disclaimer, the term of this patent is extended or adjusted under 35 U.S.C. 154(b) by 0 days.

(21) Appl. No.: 18/517,316

(22) Filed: Nov. 22, 2023

(65) Prior Publication Data

US 2024/0174370 A1    May 30, 2024

(30) Foreign Application Priority Data

Nov. 28, 2022   (FR) ...................................... 2212408

(51) Int. Cl.
  *B64D 29/02*      (2006.01)
  *B64D 29/06*      (2006.01)
(52) U.S. Cl.
  CPC ............. *B64D 29/02* (2013.01); *B64D 29/06* (2013.01)
(58) Field of Classification Search
  CPC ........ B64D 29/00; B64D 29/02; B64D 29/06; B64D 29/08; F02K 1/70; F02K 1/72; F02K 1/80; F05D 2230/72; B64C 27/02
  See application file for complete search history.

(56) References Cited

U.S. PATENT DOCUMENTS

| | | | | |
|---|---|---|---|---|
| 4,044,973 A | * | 8/1977 | Moorehead | .......... B64D 27/402 244/54 |
| 4,920,744 A | * | 5/1990 | Garcia | ................... B64D 29/08 244/54 |
| 7,255,307 B2 | * | 8/2007 | Mayes | ................... B64D 29/08 244/129.5 |
| 2010/0284806 A1 | * | 11/2010 | Vauchel | ................. B64D 29/08 415/214.1 |
| 2019/0112063 A1 | * | 4/2019 | Byrne | .................... B64D 29/08 |
| 2020/0023984 A1 | | 1/2020 | Lim et al. | |
| 2020/0025135 A1 | | 1/2020 | Joret et al. | |

FOREIGN PATENT DOCUMENTS

| | | |
|---|---|---|
| FR | 3053957 A1 | 1/2018 |
| FR | 3064980 A1 | 10/2018 |

OTHER PUBLICATIONS

French Search Report for corresponding French Patent Application No. 2212408 dated May 15, 2023; priority document.

* cited by examiner

*Primary Examiner* — Arfan Y. Sinaki
(74) *Attorney, Agent, or Firm* — Greer, Burns & Crain, Ltd.

(57) ABSTRACT

A propulsion system fastened to one side of an aircraft and having a longitudinal axis and a mid-plane and having a nacelle with two inner cowls, two outer cowls, two lower structural elements and two upper structural elements, wherein each outer cowl is articulated on a pylon by hinges with axes parallel to the longitudinal axis. The two outer cowls are contiguous at a separation plane containing the longitudinal axis and making, with the mid-plane, an acute angle. The axes are asymmetrical with respect to the mid-plane.

6 Claims, 4 Drawing Sheets

PROPULSION SYSTEM OF AN AIRCRAFT, HAVING AN ASYMMETRICAL NACELLE

CROSS-REFERENCES TO RELATED APPLICATIONS

This application claims the benefit of the French patent application No. 2212408 filed on Nov. 28, 2022, the entire disclosures of which are incorporated herein by way of reference.

FIELD OF THE INVENTION

The present invention relates to a propulsion system of an aircraft, having an asymmetrical nacelle for a turbomachine. The present invention also relates to an aircraft having at least one such propulsion system.

BACKGROUND OF THE INVENTION

FIG. 4 is a front view of a propulsion system 400 of the prior art for an aircraft. The aircraft has a fuselage on either side of which is fastened a wing 402. The propulsion system 400 conventionally comprises a pylon 404, a turbomachine having a core 408 and a nacelle 410. FIG. 4 shows the port side of an aircraft, wherein the wing 402 has a proximal end 402a as one with the fuselage of the aircraft, and a distal end 402b. Conventionally, the pressure side 402c of the wing 402 rises between the proximal end 402a and the distal end 402b.

The pylon 404 is fastened beneath the wing and it bears the core 408 and the nacelle 410.

In order to allow maintenance to be performed on the propulsion system 400, the nacelle 410 has cowls that are able to move between a closed position in which the cowls are closed up around the core 408 and an open position in which the cowls are distant from the core 408.

In particular, the nacelle 410 has two inner cowls 412a-b (also called IFS for "Internal Fixed Structure") and two outer cowls 414a-b (also called OS for "Outer Structure").

Each cowl 412a-b, 414a-b takes the general shape of a half-cylinder, and the nacelle 410 has, on either side of a vertical mid-plane XZ passing through the central axis of the core 408, an inner cowl 412a-b and an outer cowl 414a-b around the inner cowl 412a-b.

In the closed position, the two inner cowls 412a-b are contiguous at the mid-plane and overall form a cylinder that surrounds the core 408 and constitutes the internal part of a bypass duct 411, and the two outer cowls 414a-b are contiguous at the mid-plane and overall form a cylinder that surrounds the inner cowls 412a-b and constitutes the external part of the bypass duct 411.

Each outer cowl 414a-b is mounted articulated on the pylon 404 via hinges of which the axes 415a-b are generally parallel to the longitudinal axis of the turbomachine.

Each inner cowl 412a-b is fastened to the associated outer cowl 414a-b and the fastening is ensured by lower structural elements 416a-b and upper structural elements 418a-b. Thus, for each outer cowl 414a-b, the associated inner cowl 412a-b is fastened to the outer cowl 414a-b in the bottom part at 6 o'clock by a lower structural element 416a-b and in the top part at 12 o'clock by an upper structural element 418a-b.

The two axes 415a-b of the hinges are symmetrical to one another with respect to the mid-plane XZ and the lower structural elements 416a-b are contiguous at the mid-plane XZ.

In the context of the integration of a propulsion system 400 of large diameter and as a result of the geometry of the wing 402, the opening of the cowls, and in particular in this case of the port cowl 414a, is limited as a result of the proximity of the wing 402, and it is therefore necessary to find a particular arrangement that allows greater opening and therefore better accessibility during maintenance operations.

SUMMARY OF THE INVENTION

An object of the present invention is to propose a propulsion system that has an asymmetrical nacelle.

To this end, a propulsion system for an aircraft is proposed, the propulsion system having a longitudinal axis and a vertical mid-plane passing through the longitudinal axis and having:
- a pylon intended to be fastened under a wing with a dihedral angle to a port side of the aircraft,
- a turbomachine with a core fastened to the pylon, and
- a nacelle in which the turbomachine is housed and which has:
  two inner cowls arranged around the core,
  two outer cowls arranged around the inner cowls,
  two lower structural elements, each fastening an inner cowl to the associated outer cowl at a bottom part of the nacelle, and
  two upper structural elements, each fastening an inner cowl to the associated outer cowl at a top part of the nacelle,
  wherein each outer cowl is mounted articulated on the pylon via hinges of which the axes are generally parallel to the longitudinal axis,
  wherein, in the closed position and in the top part of the nacelle, the two outer cowls are contiguous at a separation plane that contains the longitudinal axis and makes, with the mid-plane, an acute angle counted positively in the clockwise direction in front view, and
  wherein the axis corresponding to the port-side outer cowl is disposed on the port side with respect to the separation plane, and wherein the axis corresponding to the starboard-side outer cowl is disposed on the starboard side with respect to an axis symmetrical to the axis corresponding to the port-side outer cowl with respect to the mid-plane.

To this end, a propulsion system for an aircraft is also proposed, the propulsion system having a longitudinal axis and a vertical mid-plane passing through the longitudinal axis and having:
- a pylon intended to be fastened under a wing with a dihedral angle to a starboard side of the aircraft,
- a turbomachine with a core fastened to the pylon, and
- a nacelle in which the turbomachine is housed and which has:
  two inner cowls arranged around the core,
  two outer cowls arranged around the inner cowls,
  two lower structural elements, each fastening an inner cowl to the associated outer cowl at a bottom part of the nacelle, and
  two upper structural elements, each fastening an inner cowl to the associated outer cowl at a top part of the nacelle,
  wherein each outer cowl is mounted articulated on the pylon via hinges of which the axes are generally parallel to the longitudinal axis,
  wherein, in the closed position and in the top part of the nacelle, the two outer cowls are contiguous at a separation plane that contains the longitudinal axis and makes, with the mid-plane, an acute angle counted positively in the counter-clockwise direction in front view, and wherein the axis corresponding to the starboard-side outer cowl is disposed on the starboard side with respect to the separation plane, and wherein the axis corresponding to the port-side outer cowl is disposed on the port side with respect to an axis symmetrical to the axis corresponding to the starboard-side outer cowl with respect to the mid-plane.

With such an implementation, the opening of the cowls is improved.

According to one particular embodiment, in the bottom part of the nacelle and in the closed position, the two outer cowls and the lower structural elements are contiguous at the separation plane.

According to one particular embodiment, in the bottom part of the nacelle and in the closed position, the two outer cowls and the lower structural elements are contiguous at the separation plane.

The invention also proposes an aircraft having a wing beneath which is fastened at least one propulsion system according to one of the preceding variants, via its pylon.

BRIEF DESCRIPTION OF THE DRAWINGS

The abovementioned features of the invention, along with others, will become more clearly apparent upon reading the following description of one exemplary embodiment, the description being given with reference to the appended drawings, in which.

DETAILED DESCRIPTION OF THE PREFERRED EMBODIMENTS

In the following description, terms relating to a position are considered in relation to an aircraft in a position of forward movement.

Figure 1:
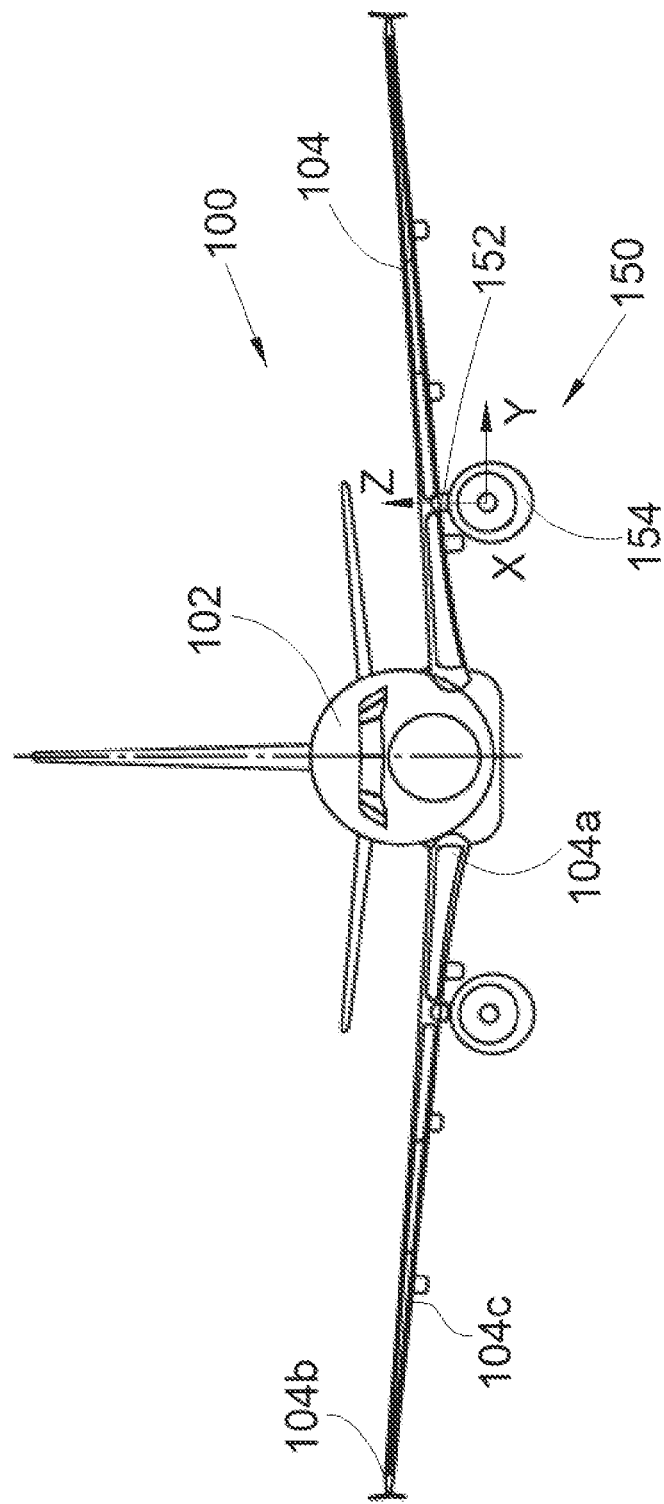
FIG. 1 is a front view of an aircraft according to the invention.

FIG. 1 shows an aircraft 100 that has a fuselage 102 and a wing 104 on each side of the fuselage 102. Beneath each wing 104, the aircraft 100 has propulsion system 150 that has a pylon 152, a turbomachine and a nacelle 154. The turbomachine, which has a core, is housed inside the nacelle 154.

In the following description, and by convention, the X axis is the longitudinal axis of the propulsion system 150, with positive orientation in the direction of forward movement of the aircraft 100, the Y direction is the transverse direction, which is horizontal when the aircraft 100 is on the ground, and the Z direction is the vertical direction when the aircraft 100 is on the ground, these three directions X, Y and Z being mutually orthogonal. The longitudinal axis X is the central axis of the core.

Each wing 104 has a proximal end 104a as one with the fuselage 102, and a distal end 104b. Conventionally, the pressure side 104c of the wing 104 rises between the proximal end 104a and the distal end 104b. the wing 104 has a dihedral angle.

The pylon 152 is fastened beneath the pressure side 104c of the wing 104 and the pylon 152 bears the core and the nacelle 154.

Figure 2:
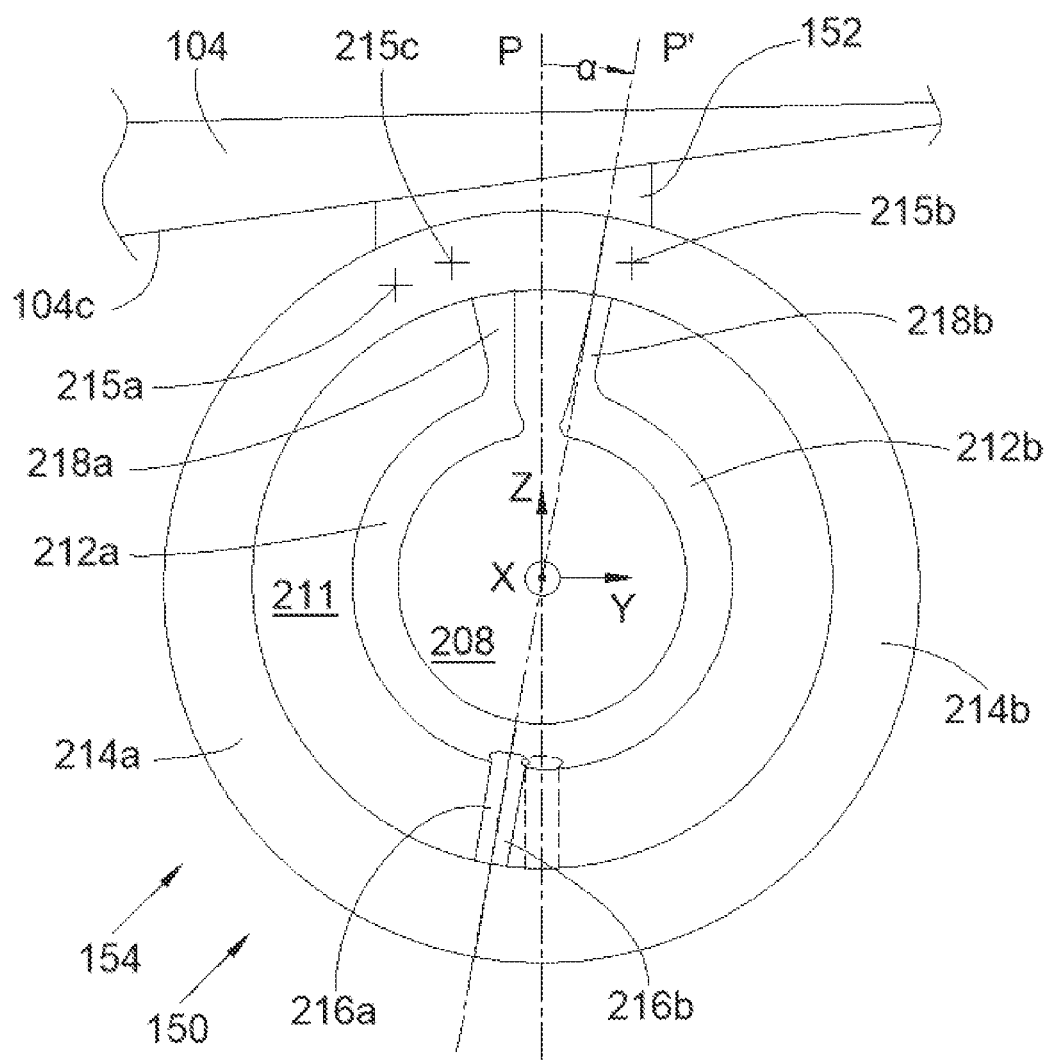
FIG. 2 is a front view of a propulsion system according to the invention in the closed position.
Figure 3:
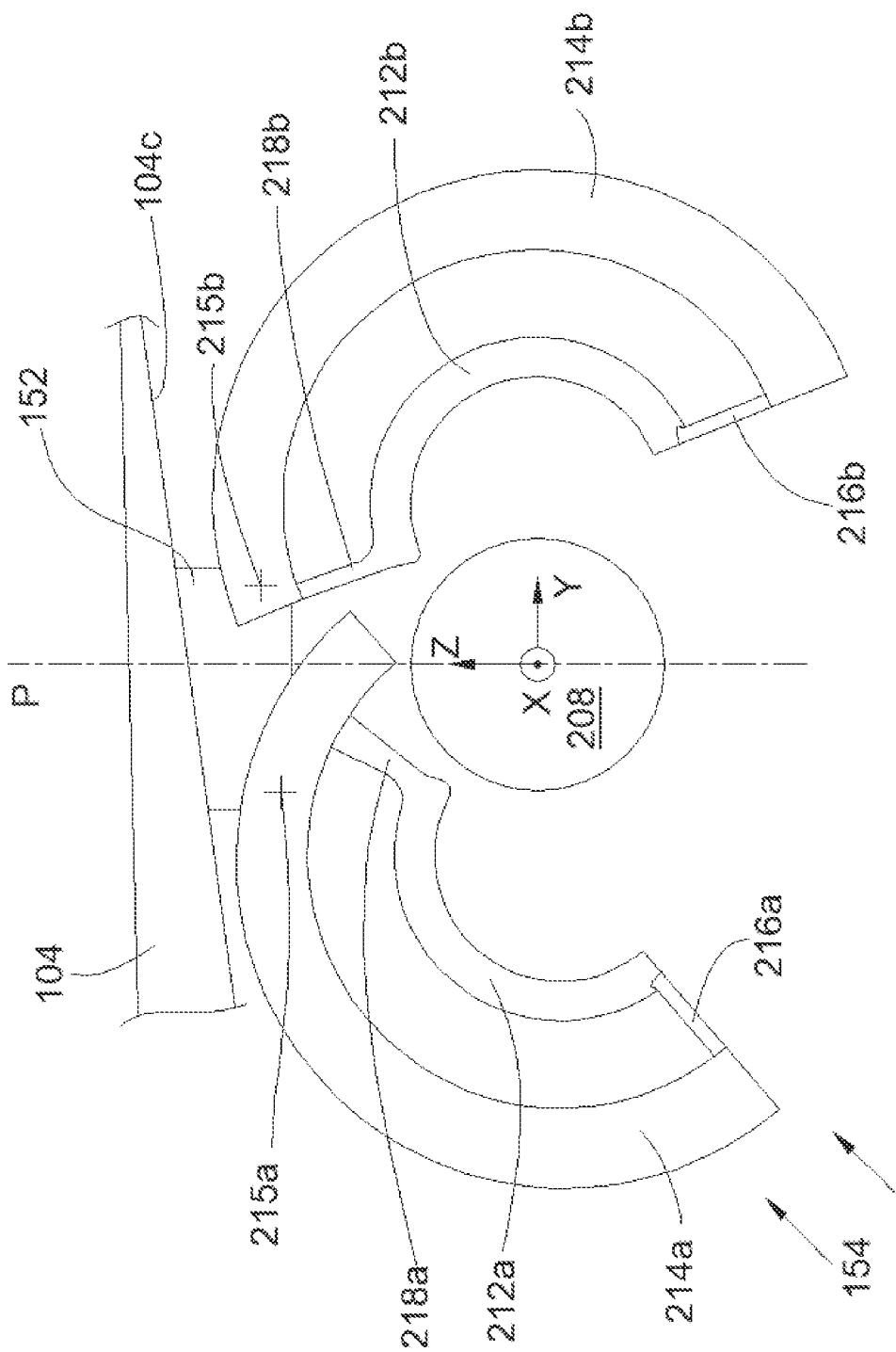
FIG. 3 is a front view of the propulsion system in FIG. 2 in the open position.
Figure 4:
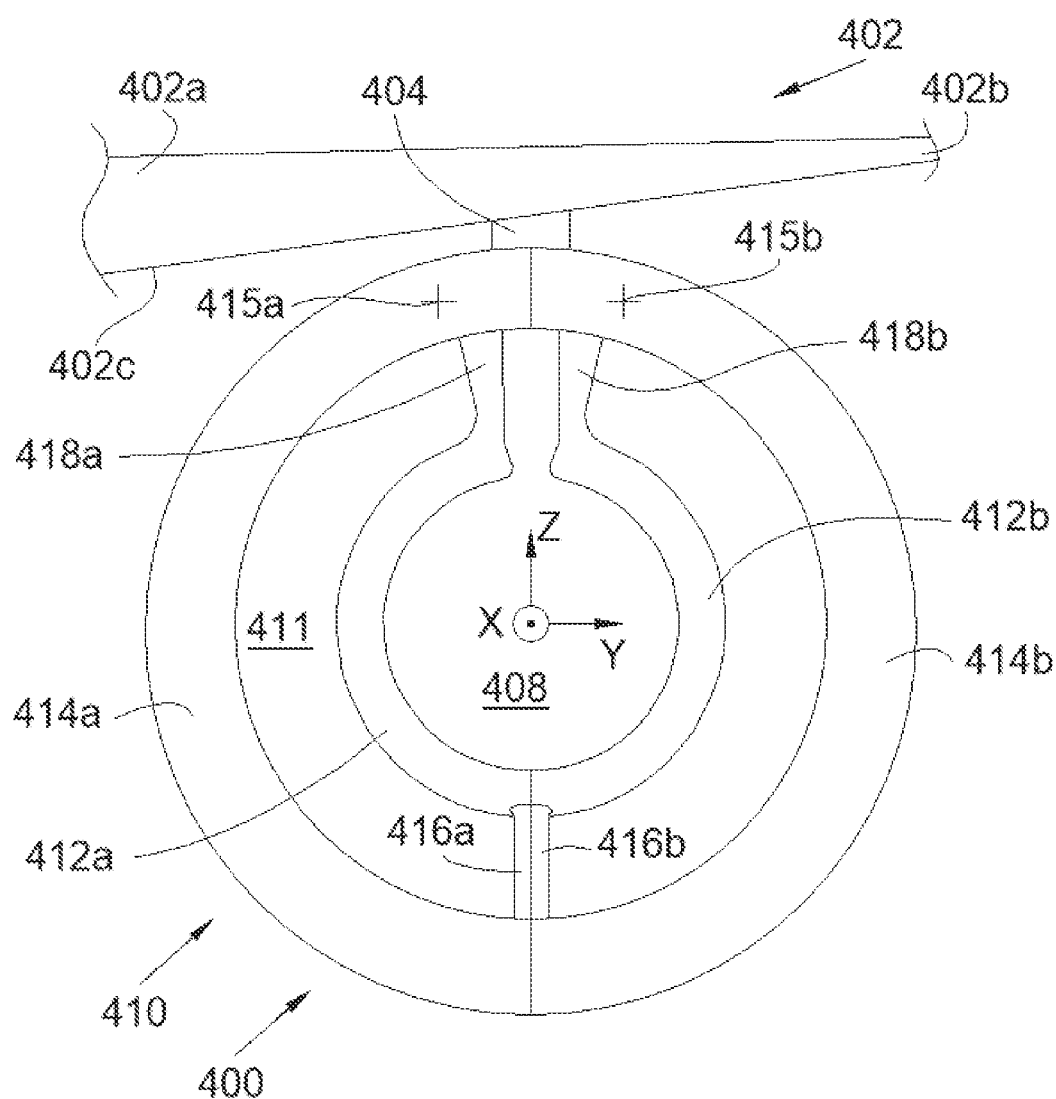
FIG. 4 is a front view of a propulsion system of the prior art in the closed position.

FIG. 2 shows the propulsion system 150 in the closed position and FIG. 3 shows the propulsion system 150 in the open position. The propulsion system 150 in FIGS. 2 and 3 is the one for which the pylon 152 is fastened to a port side on the aircraft 100.

The nacelle 154 has cowls that are able to move between the closed position in which the cowls are closed up around the core 208 and an open position in which the cowls are distant from the core 208. The nacelle 154 has two inner cowls 212a-b (also called IFS for "Internal Fixed Structure") and two outer cowls 214a-b (also called OS for "Outer Structure"). The two inner cowls 212a-b are arranged around the core 208 and the outer two cowls 214a-b are arranged around the inner cowls 212a-b.

The propulsion system 150 has a vertical mid-plane P (XZ) passing through the longitudinal axis X and a separation plane P' that contains the longitudinal axis X of the corresponding core 208 and makes, with the mid-plane P, an acute angle α counted positively in the clockwise direction in front view. The angle α is, for example, between 5° and 20°, and more particularly of the order of 10°.

For a propulsion system 150 of which the pylon 152 is fastened to a starboard side of the aircraft 100, the propulsion system 150 has a vertical mid-plane P (XZ) passing through the longitudinal axis X of the corresponding core 208 and a separation plane P' that contains the longitudinal axis X and makes, with the mid-plane P, an acute angle α counted positively in the counter-clockwise direction in front view. The angle α is, for example, between 5° and 20°, and more particularly of the order of 10°.

This means that, between a port-side propulsion system 150 and a starboard-side one, the inclination of the separation plane P' with respect to the mid-plane P is reversed as a result of the reversed orientation of the pressure side 104c of the wing 104.

Each cowl 212a-b, 214a-b takes the general shape of a portion of a cylinder, and the nacelle 154 has, on either side of the separation plane P', an inner cowl 212a-b and an outer cowl 214a-b around the inner cowl 212a-b. Each cowl 212a-b, 214a-b is coaxial with the longitudinal axis X.

In the top part of the nacelle 154, i.e., in the vicinity of the 12 o'clock zone, in the closed position, the two outer cowls 214a-b are contiguous at the separation plane P'.

In the embodiment of the invention that is presented in FIG. 2, in the bottom part of the nacelle 154, i.e., in the vicinity of the 6 o'clock zone, in the closed position, the two outer cowls 214a-b are contiguous at the separation plane P', and this makes it possible to offset the locks that are disposed at the separation plane P' by offsetting them so as to move them away from the ground. Furthermore, this embodiment allows better accessibility for the passage of a ladder in the open position.

However, in another embodiment shown in dashed lines in FIG. 2, the two outer cowls 214a-b can be contiguous at the separation plane P.

In the top part of the nacelle 154, the two inner cowls 212a-b are not contiguous in the closed position, so as to allow the passage of the elements that fasten the core 208 to the pylon 152.

In the bottom part of the nacelle 154 and in the closed position, the two inner cowls 212a-b are contiguous at the separation plane P' or the mid-plane P, as is the case for the outer cowls 214a-b.

In the closed position, the two inner cowls 212*a-b* overall form a cylinder that surrounds the core 208 and constitutes the internal part of a bypass duct 211, and the two outer cowls 214*a-b* overall form a cylinder that surrounds the inner cowls 212*a-b* and constitutes the external part of the bypass duct 211.

Each inner cowl 212*a-b* is fastened to the associated outer cowl 214*a-b* and the fastening is ensured by lower structural elements 216*a-b* at the bottom part of the nacelle 154 and by upper structural elements 218*a-b* at the top part of the nacelle 154. Thus, for each outer cowl 214*a-b*, the associated inner cowl 212*a-b* is fastened to the outer cowl 214*a-b* at the top part in the vicinity of the 12 o'clock zone by an upper structural element 218*a-b* and at the bottom part in the vicinity of the 6 o'clock zone by a lower structural element 216*a-b*.

Depending on the circumstances, the lower structural elements 216*a-b* are contiguous at the separation plane P' or the mid-plane P.

Each outer cowl 214*a-b* is mounted articulated, between the open position and the closed position, on the pylon 152 via hinges of which the axes 215*a-b* are generally parallel to the longitudinal axis X.

In the embodiment of the invention that is presented in FIG. 2, the axis 215*b* that is on the port side and corresponds to the port-side outer cowl 214*b* is disposed on the port side with respect to the separation plane P', and the axis 215*a* that is on the starboard side and corresponds to the starboard-side outer cowl 214*a* is disposed on the starboard side with respect to an axis 215*c* symmetrical to the axis 215*b* corresponding to the port-side outer cowl 214*b* with respect to the mid-plane P. The two axes 215*a-b* of the hinges are thus symmetrical to one another with respect to the mid-plane P. The offset of the axis 215*a* that is on the starboard side allows different opening kinematics for the starboard-side outer cowl 214*a*, wherein the opening of the starboard-side outer cowl 214*a* is less limited by the presence of the wing 104. The offset also makes it possible to move the top part of the thrust reversers of the propulsion system 150 away from the slats of the leading edge of the wing 104.

For a propulsion system 150 mounted on the starboard side, it is the axis 215*a* that is on the starboard side and corresponds to the starboard-side outer cowl 214*a* that is disposed on the starboard side with respect to the separation plane P', and the axis 215*b* that is on the port side and corresponds to the port-side outer cowl 214*b* is disposed on the port side with respect to an axis symmetrical to the axis 215*a* corresponding to the starboard-side outer cowl 214*a* with respect to the mid-plane P. The two axes 215*a-b* of the hinges are thus asymmetrical to one another with respect to the mid-plane P. The offset of the axis 215*b* that is on the port side allows different opening kinematics for the port-side outer cowl 214*b*, wherein the opening of the port-side outer cowl 214*b* is less limited by the presence of the wing 104.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A propulsion system for an aircraft, said propulsion system having a longitudinal axis and a vertical mid-plane passing through the longitudinal axis, the propulsion system comprising:
   a pylon configured to be fastened under a wing with a dihedral angle to a port side of the aircraft,
   a turbomachine with a core fastened to the pylon, and
   a nacelle in which the turbomachine is housed and which comprises:
      two inner cowls arranged around the core,
      two outer cowls arranged around the inner cowls, the two outer cowls including a port-side outer cowl and a starboard-side outer cowl demarcated by the vertical mid-plane,
      two lower structural elements, each fastening an inner cowl of the two inner cowls to an associated outer cowl of the two outer cowls at a bottom part of the nacelle, and
      two upper structural elements, each fastening an inner cowl of the inner cowls to an associated outer cowl of the two outer cowls at a top part of the nacelle,
   wherein each outer cowl is articulable and mounted on the pylon via hinges of which axes of the hinges are generally parallel to the longitudinal axis,
   wherein, in a closed position and in the top part of the nacelle, the two outer cowls are contiguous at a separation plane that contains the longitudinal axis and makes, with the vertical mid-plane, an acute angle in a clockwise direction in a front view of the propulsion system, and wherein a first axis corresponding to the port-side outer cowl is disposed on a port side with respect to the separation plane, and
   wherein a second axis corresponding to the starboard-side outer cowl is disposed on a starboard side with respect to a third axis symmetrical to the first axis corresponding to the port-side outer cowl with respect to the vertical mid-plane.

2. The propulsion system according to claim 1, wherein, in the bottom part of the nacelle and in the closed position, the two outer cowls and the lower structural elements are contiguous at the separation plane.

3. An aircraft having a wing, wherein at least one propulsion system according to claim 1 is fastened beneath the wing, via the pylon.

4. A propulsion system for an aircraft, said propulsion system having a longitudinal axis and a vertical mid-plane passing through the longitudinal axis, the propulsion system comprising:
   a pylon configured to be fastened under a wing with a dihedral angle to a starboard side of the aircraft,
   a turbomachine with a core fastened to the pylon, and
   a nacelle in which the turbomachine is housed and which comprises:
      two inner cowls arranged around the core,
      two outer cowls arranged around the inner cowls,
      the two outer cowls including a port-side outer cowl and a starboard-side outer cowl demarcated by the vertical mid-plane,
      two lower structural elements, each fastening an inner cowl of the two inner cowls to the associated outer cowl of the two outer cowls at a bottom part of the nacelle, and two upper structural elements, each fastening an inner cowl of the two inner cowls to an associated outer cowl of the two outer cowls at a top part of the nacelle, wherein each outer cowl is articulable and mounted on the pylon via hinges of which axes of the hinges are generally parallel to the longitudinal axis, wherein, in a closed position and in the top part of the nacelle, the two outer cowls are contiguous at a separation plane that contains the longitudinal axis and makes, with the vertical mid-plane, an acute angle in a counter-clockwise direction in a front view of the propulsion system, and wherein a first axis corresponding to the starboard-side outer cowl is disposed on a starboard side with respect to the separation plane, and wherein a second axis corresponding to the port-side outer cowl is disposed on a port side with respect to a third axis symmetrical to the first axis corresponding to the starboard-side outer cowl with respect to the vertical mid-plane.

5. The propulsion system according to claim 4, wherein, in the bottom part of the nacelle and in the closed position, the two outer cowls and the lower structural elements are contiguous at the separation plane.

6. An aircraft having a wing, wherein at least one propulsion system according to claim 4 is fastened beneath the wing, via the pylon.

* * * * *